US006280103B1

United States Patent
Zawodny et al.

(10) Patent No.: US 6,280,103 B1
(45) Date of Patent: Aug. 28, 2001

(54) APS CAMERA FOR ENSURING THE CASSETT INDICATOR IS IN THE PARKED POSITION

(75) Inventors: Arthur Zawodny, Tsing Yi Island; Wilfried Bittner, Tsuen Wan; Franco Yik Kai Chung, N. T., all of (HK)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 09/400,963

(22) Filed: Sep. 22, 1999

(51) Int. Cl.$^7$ .............................. G03B 17/26; G03B 1/00
(52) U.S. Cl. .................. 396/515; 396/392; 396/413; 396/513; 396/516
(58) Field of Search ...................................... 396/284, 390, 396/392, 413, 515, 516, 513, 538

(56) References Cited

U.S. PATENT DOCUMENTS

| | | | |
|---|---|---|---|
| 3,491,957 | 1/1970 | Sawada et al. | 396/413 |
| 4,994,833 | 2/1991 | Cocca | 354/207 |
| 5,452,036 | 9/1995 | Kamata | 354/275 |
| 5,453,808 | 9/1995 | Zawodny et al. | 354/212 |
| 5,537,176 | 7/1996 | Hara et al. | 354/288 |
| 5,552,846 | 9/1996 | Tokui | 354/173.1 |
| 5,555,057 | 9/1996 | DiRisio | 354/212 |
| 5,576,790 | 11/1996 | Lamphron et al. | 396/389 X |
| 5,576,793 | 11/1996 | Hara et al. | 396/6 |
| 5,612,758 | 3/1997 | Petruchik | 396/413 |
| 5,614,976 | 3/1997 | Smart et al. | 396/392 |
| 5,614,977 | 3/1997 | Smart | 396/395 |
| 5,629,750 | 5/1997 | Smart et al. | 396/538 |
| 5,640,637 | 6/1997 | Stephenson, III | 396/411 |
| 5,689,733 | 11/1997 | Zawodny et al. | 396/6 |
| 5,778,269 | 7/1998 | Williams | 396/387 |
| 5,842,067 | 11/1998 | Williams | 396/413 X |
| 5,923,905 | * 7/1999 | Solomon | 396/513 |
| 6,059,464 | 5/2000 | Sakurai | 396/413 |

FOREIGN PATENT DOCUMENTS 30 16 005 A1   4/1980   (DE) .

* cited by examiner

Primary Examiner—Alan A. Mathews
(74) Attorney, Agent, or Firm—Woodcock Washburn Kurtz Mackiewicz & Norris LLP

(57) ABSTRACT

The camera of this invention includes a parking mechanism that ensures a visual exposure indicator of an APS film cassette is in the parked position prior to removing the film cassette from the camera. The camera may include a rotatable wheel that rotates in order to move the film between a film cassette compartment, a film exposing area and a film spool. In a preferred embodiment, the parking mechanism includes a pin that engages the rotatable wheel after the film has been rewound into the film cassette and the wheel has been rotated sufficient distance to ensure that the visual exposure indicator moves to the parked position. When the pin engages the rotatable wheel, the pin prevents further rotation of the rotatable wheel. This indicates to the camera user that the visual exposure indicator is in the park position. The wheel may include a cam slot into which the pin travels as the film is being rewound into the film cassette. The cam slot may include an end that contacts the pin to prevent further rotation of the wheel when the visual exposure indicator is in the park position.

27 Claims, 12 Drawing Sheets

APS CAMERA FOR ENSURING THE CASSETT INDICATOR IS IN THE PARKED POSITION

BACKGROUND OF THE INVENTION

This invention relates to a camera that has a parking mechanism for ensuring that the visual exposure indicator (VEI) of an Advanced Photo System (APS) film cassette is in the "parked" or "x" position when the film cassette is removed from the camera and exposed to light.

Advanced Photo System film cassettes, as shown in FIG. 1, have a visual exposure indicator disposed in the bottom of the cassette. The visual exposure indicator includes an icon and the plastic covering over the bottom of the film cassette. This visual exposure indicator has four positions, a circle, a half circle, an "x" and a rectangle, as shown in FIG. 1. Each of the shapes, the circle, half circle, "x" and rectangle are defined as an opening in the plastic covering disposed in the bottom of the cassette. The icon is disposed inside of the cassette and moves relative to the openings, so that it can be seen through one of the openings. When visible through one of the openings, the icon is visible as the defined shape of the respective opening.

The status of the film in the film cassette is indicated by the position of the icon relative to the openings. If the icon is visible through the circle, it indicates that the film has not been exposed and the film cassette is ready for use. When visible through the half circle, the icon indicates that the film has been thrust from the cassette or partially exposed. The "x" indicates the exposed or "parked position" in which the film has been rewound into the cassette. Finally, the rectangle indicates that the film has been processed or developed. The VEI of the cassette is beneficial because the status of the film can be quickly obtained by examining the VEI. Therefore, it is important to ensure that the VEI always indicates the proper status of the film. For example, if the VEI was in the wrong position, it may be mistakenly understood that the film has not been completely exposed when it has.

The icon of the VEI operates with the spindle of the film cassette. By rotating the spindle, the VEI is moved to the various positions. In order to move the icon to the "x" position, the trailing edge of the film must be rewound into the cassette after the light lock door of the cassette has been closed. Potentially, the VEI could remain in the half circle position when the trailing edge of the film enters the cassette and the light lock door is closed. The spindle must be rotated a further distance after the closing of the light lock door to ensure that the VEI moves to the "x" position.

Motorized APS cameras typically ensure the spindle is rotated this further distance by detecting the film is fully inside of the cassette 14 or the closing of the light lock door and then rotating the spindle a predetermined rotational distance that corresponds to the VEI moving to the "x" position. Detection can be done with a film sensor that detects movement of the trailing edge of the film into the film cassette. Alternately, a mechanism that operates with the light lock door and senses the movement of the light lock door to the closed position can be used. Since the camera is motorized, circuitry can be used to ensure the motor rotates the spindle this predetermined rotational distance after the light lock door is closed.

In order to reduce the cost of APS cameras, its desirable to develop manual APS cameras. These cameras are termed "manual" because they would not have a motor for moving the film. Rather, they would have a mechanism, such as a thumb wheel or a crank, that can be manipulated by a camera user to manually move the film within the camera. Since such a camera does not have a motor, the camera user must rotate the spindle after the closing of the light lock door to ensure that the VEI moves to the "x" or parked position. Potentially, the camera user could drive the trailing edge of the film into the film cassette 14 and close the light lock door and stop further movement of the film. At this point, the VEI may still be in the half circle position. Further, the camera user could then remove the cassette from the camera. A later inspection of the film cassette would incorrectly indicate that the film has not all be exposed. Thus, there is a need for the camera user to know when the VEI has moved to the parked position.

This invention relates to a camera that has a mechanism for ensuring that the VEI of an APS film cassette is in the proper position after the film has been exposed and rewound into the film cassette. This invention also relates to such a mechanism that can be employed with a manual APS camera.

SUMMARY OF THE INVENTION

The camera of this invention preferably includes a parking mechanism for ensuring that the visual exposure indicator of an APS film cassette moves to the parked position after all the film has been rewound into the film cassette. The camera may further include a film cassette compartment into which an APS film cassette may be light sealed, a film path and a film spool. The film preferably moves along the film path between the film cassette compartment and the film spool after each exposure and when the film is rewound into the film cassette. The camera may also include a film advancing mechanism which is manipulated by a camera user to move the film along the film path. When the film cassette is inserted into the film cassette compartment, the film advancing mechanism is coupled to a spindle of the film cassette in order to move the film into and out of the film cassette.

The film advancing mechanism preferably includes a rotatable wheel and a wheel gear. The rotatable wheel may be manipulated by a camera user to manually move film along the film path. Preferably, the wheel gear is coupled to the rotatable wheel, so that the wheel gear rotates with the wheel. The rotatable wheel gear preferably has a cam slot disposed in a wall and an inner periphery along which an entrance of the cam slot is disposed. The cam slot preferably extends around the wall a sufficient distance to ensure that the visual exposure indicator moves to the park position after all the film has been rewound in the film cassette. A pocket may be disposed at the end of the cam slot. The rotatable wheel gear has an interior wall that defines a cavity inside of the wall.

The parking mechanism may include a parking lever that is rotatably mounted to the camera. The parking lever preferably has a parking pin extending from the lever that rests within the cavity defined by the advance wheel gear. When the advance wheel gear is being rotated to move film within the camera, the parking pin preferably remains stationary within the cavity. After the film has been exposed and as the trailing edge of the film is being rewound into the film cassette, the parking lever is preferably rotated so that the parking pin moves towards the cam slot and enters the cam slot. Further rotation of the advance wheel, will move the advance wheel gear and the cam slot relative to the parking pin. Prior to the pocket of the cam slot contacting the parking pin, all of the film is rewound into the film cassette. Further rotation of the advance wheel gear moves the pocket of the cam slot to contact the parking pin. At this point, further rotation of the advance wheel gear and therefore, the advance wheel is prevented by the parking pin. This indicates to the camera user that the visual exposure indicator has moved due to the rotation of the advance wheel gear to the parked position and that the film cassette is ready to be removed from the camera. The parking mechanism provides this indication because the wheel is rotated sufficiently after the trailing edge of the film has entered the film cassette to ensure that the visual exposure indicator has moved to the park position.

The parking mechanism may further include a parking spring that is mounted to the camera and the parking lever. The parking spring biases the parking lever to rotate, so that the parking pin rotates toward the interior wall of the wheel. In addition, the camera may further include a film sensor disposed within the film path. The film sensor is preferably coupled to a linkage, and both the film sensor and the linkage are rotatably mounted to the camera. When film is thrust from the film cassette into the film path, the film contacts the film sensor and rotates the film sensor and linkage in a first direction. As the linkage rotates in the first direction, the linkage will contact the parking lever to rotate the parking lever against the bias of the parking spring. When rotating against the bias of the parking spring, the parking lever and the parking pin rotate so that the parking pin is disposed within the cavity of the wheel. The parking pin will remain in this position, so long as the film presses against the film sensor. The film will push against the film sensor until the trailing edge of the film is rewound past the film sensor into the film cassette.

When the film is rewound into the film cassette, the trailing edge of the film passes the film sensor and releases the film sensor and the linkage. Once released, the film sensor and the linkage rotate in a second direction, and the linkage releases the parking lever. As the parking lever is released, the parking lever rotates, due to the bias of the parking spring so that the parking pin moves towards the interior wall of the wheel. When the wheel has rotated, so that the entrance of the cam slot is disposed proximal to the parking pin, the parking pin will rotate due to the bias of the parking spring into the entrance of the cam slot. At that point the advance wheel gear will rotate so that the cam slot moves with the parking pin disposed in the cam slot.

The camera may further include a flexible hook mounted within the cavity. The flexible hook is preferably mounted along an exit of the cam slot which is disposed at the pocket. The flexible hook prevents the parking pin from exiting the cam slot until the film cassette compartment door is open.

The camera may further include a door that covers the film cassette compartment after a film cassette has been inserted into the film cassette compartment. Preferably, the door light seals the film cassette compartment. The camera may further include an actuator that is rotatably mounted to the camera and a gear that is also rotatably mounted to the camera. The gear is preferably mechanically coupled to the actuator, so that the gear rotates in response to rotation of the actuator. When the film cassette compartment door is closed, the door pushes the actuator to rotate and thereby rotate the gear. In order to remove the film cassette from the film cassette compartment, the actuator is rotated. Rotation of the actuator opens the door of the film cassette compartment and rotates the gear. When the gear rotates, the gear contacts the parking lever to push the parking lever. When pushed, the parking lever rotates against the bias of the parking spring and the parking pin engages the flexible hook. As the parking pin engages the flexible hook, the parking pin pushes the hook so that the parking pin can travel over the hook, exit the cam slot and enter the interior cavity of the wheel. With the parking pin disposed in the cavity, the advance wheel and advance wheel gear can be rotated and the camera is ready for insertion of another film cassette. Other features of the invention are described below.

DETAILED DESCRIPTION OF PREFERRED EMBODIMENTS

Figures 1, 1A:
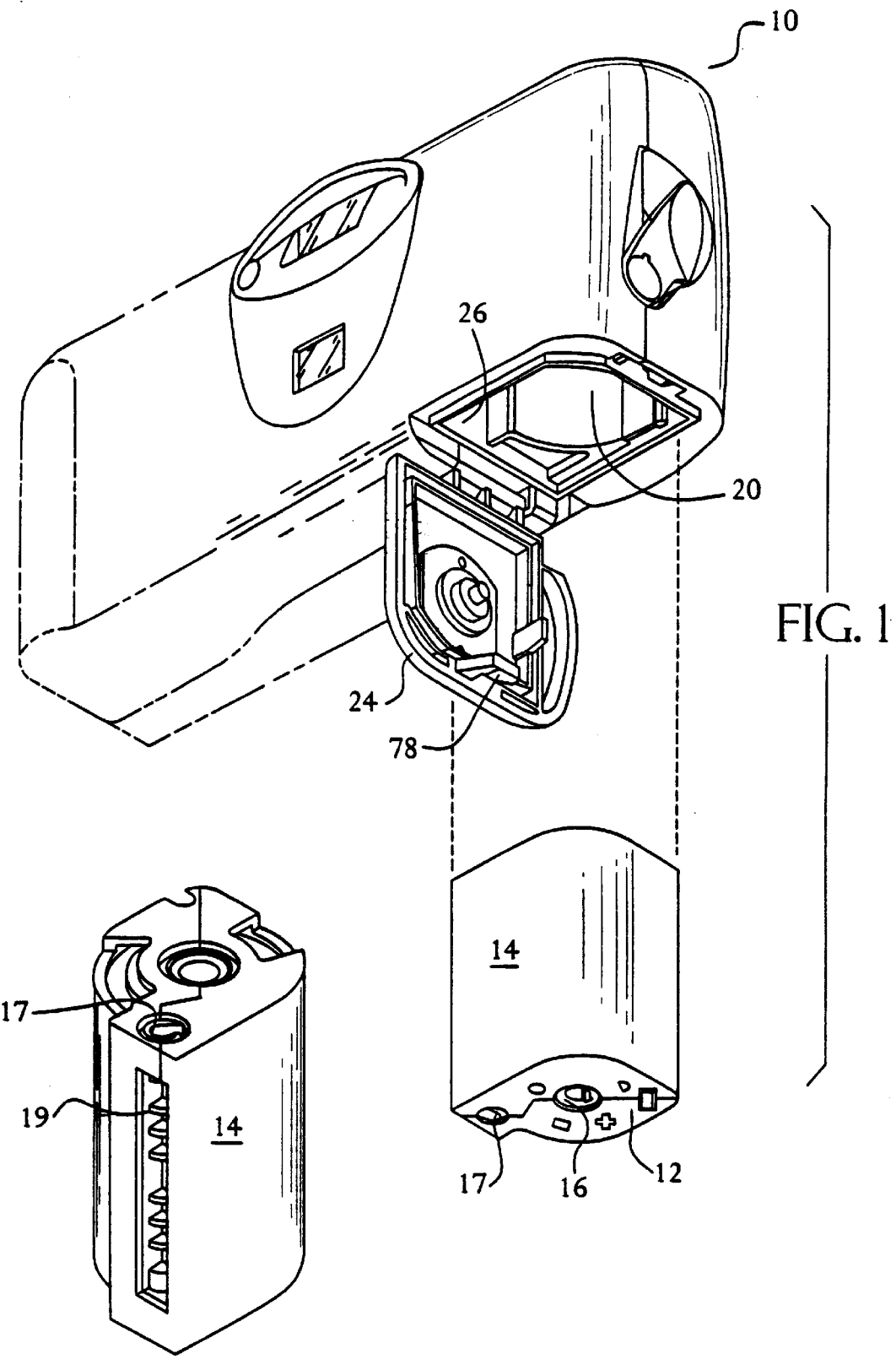
FIG. 1 is an isometric view of a camera that contains the inventions described below and an APS film cassette that can be loaded into the camera.
FIG. 1A is a perspective view of an APS film cassette than can be used with the camera of this invention.
Figure 2:
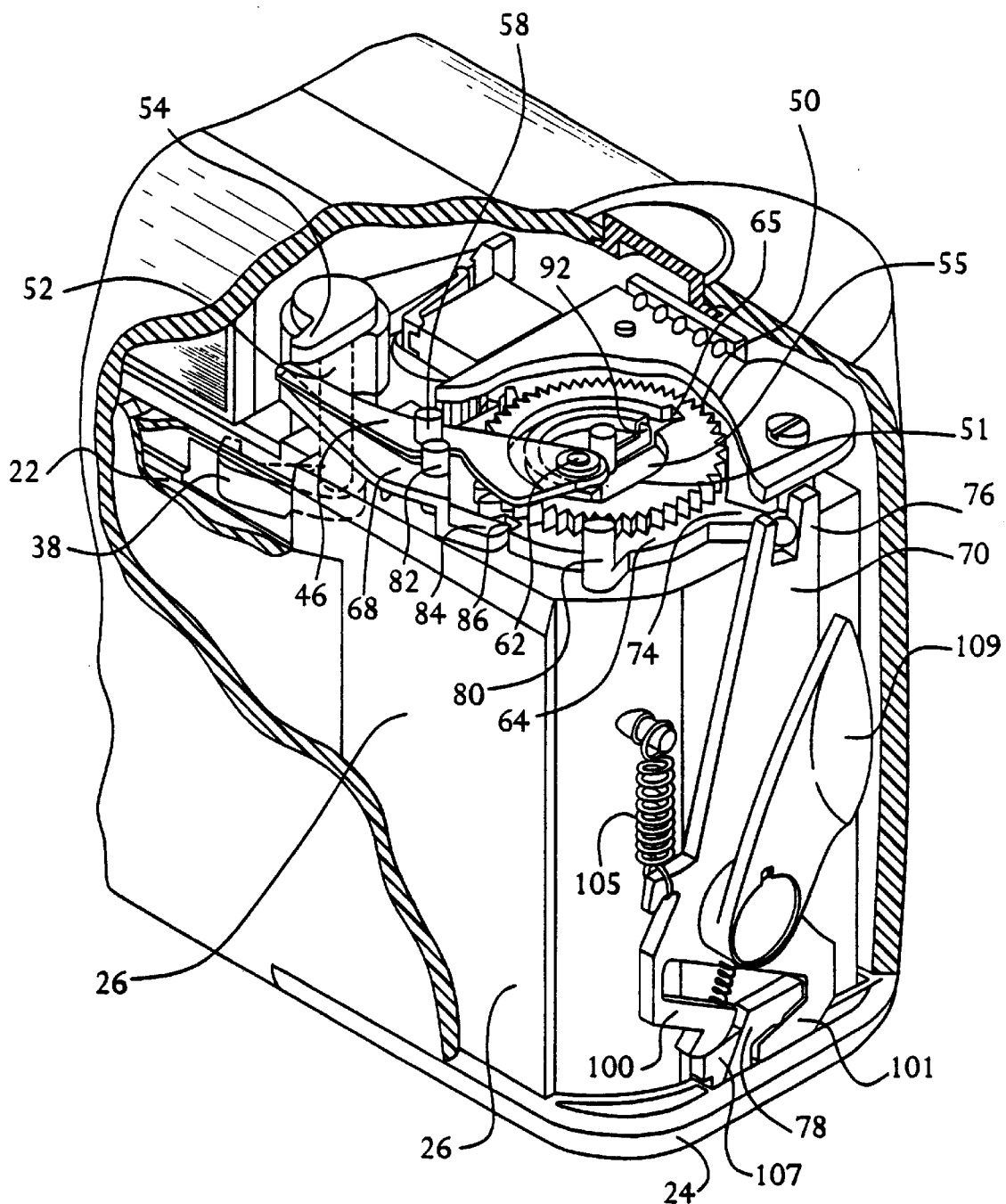
FIG. 2 is a cut away view of a preferred embodiment of the parking mechanism of this invention.
Figure 3:
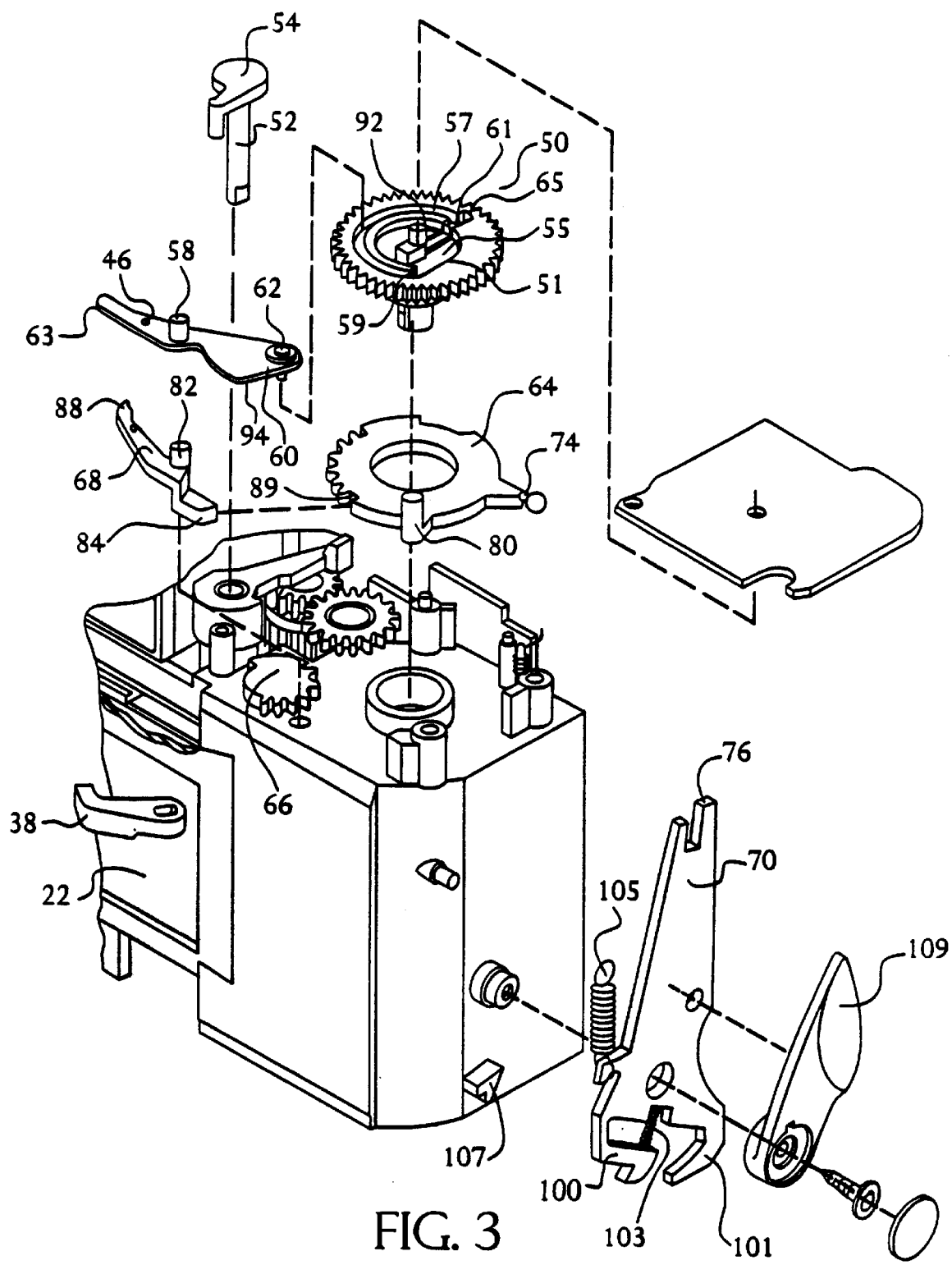
FIG. 3 is an assembly drawing of the parking mechanism of FIG. 2.
Figure 14:
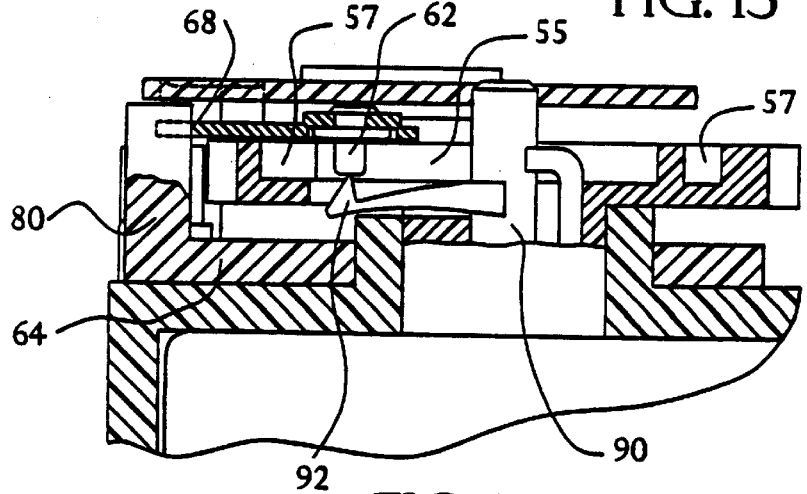
FIG. 14 is a cross section taken along line 14—14 of FIG. 8.
Figure 15:
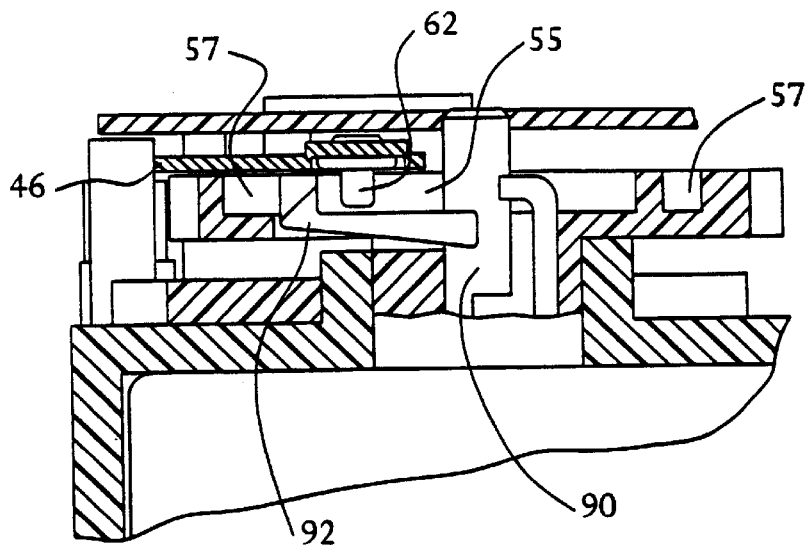
FIG. 15 is a cross section taken along line 15—15 of FIG. 9.
Figure 16:
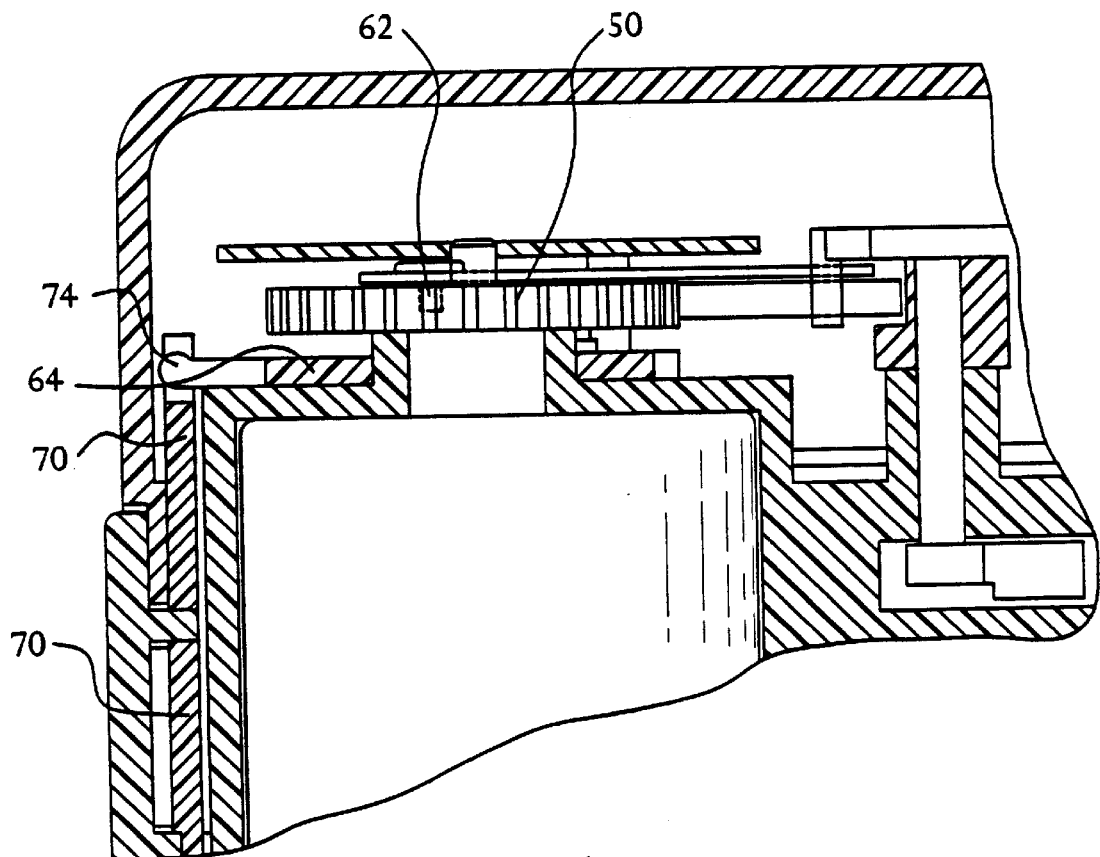
FIG. 16 is an elevation front view of the parking mechanism of FIG. 2.
Figure 17:
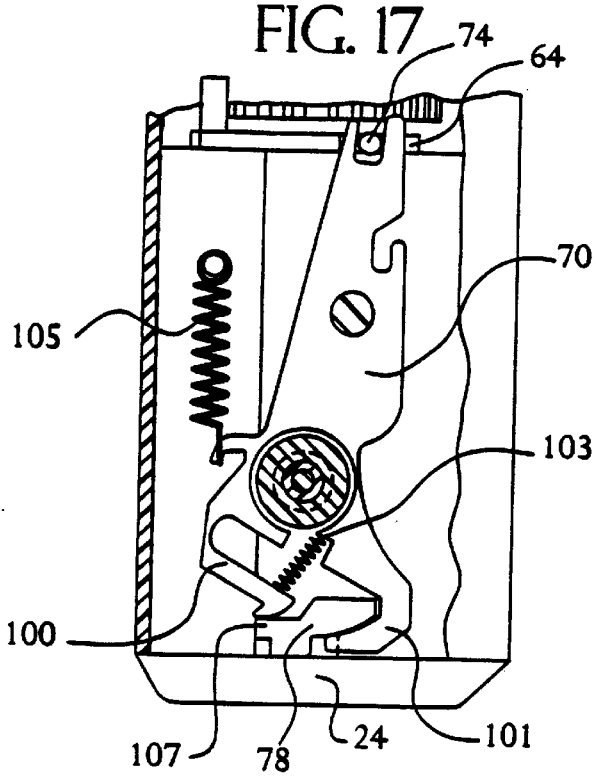
FIG. 17 is a diagrammatical side view of the camera with the door of the film cassette compartment closed.
Figure 18:
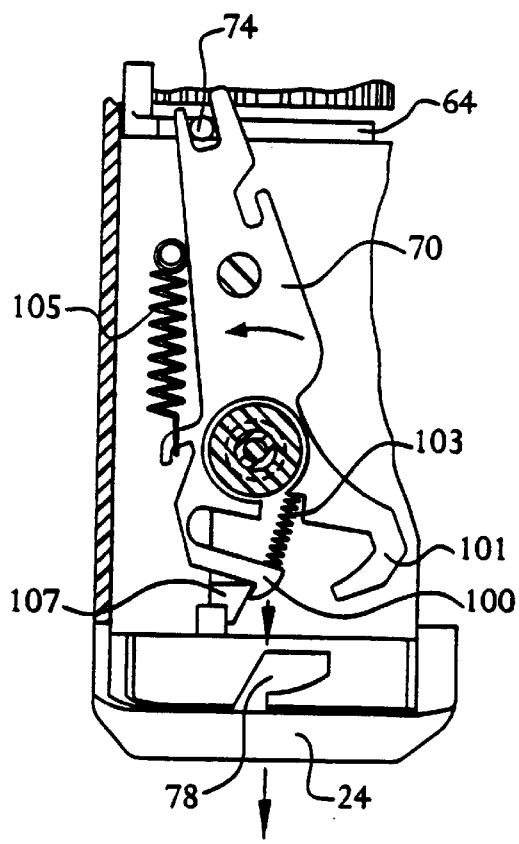
FIG. 18 is a diagrammatical side view of the camera as the door of the film cassette compartment is being opened.
Figure 19:
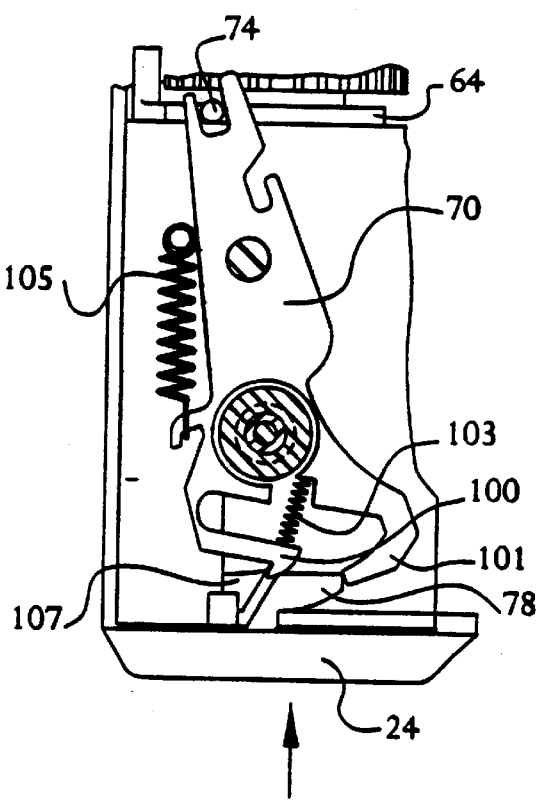
FIG. 19 is a diagrammatical side view of the camera as the door of the film cassette compartment is being closed.

As alluded to above, the camera 10 of this invention ensures that the Visual Exposure Indicator (VEI) 12 of an Advanced Photo System (APS) film cassette 14 has moved to the parked position after the film has been exposed and rewound into the cassette 14. The camera also communicates to a camera user that the VEI 12 has moved to the parked position. The APS film cassette has a light lock door drive 17, as shown in FIGS. 1 and 1A, which is an integral part of the light lock door 19, shown in FIG. 1A, that lights seals the film within the film cassette. The APS film cassette also has a VEI 12, as described above. Other features of the APS film cassette are known in the art and are not described here further. A view of the exterior of an embodiment of the camera 10 is shown in FIG. 1. This embodiment is shown for illustrative purposes, and the invention is not limited to a camera having this exterior. FIGS. 2 and 3 illustrate the assembly of various components of the camera. FIGS. 4–9 and 10–15 illustrate operation of the parking mechanism. FIG. 16 is an elevation front view showing various components of the camera, and FIGS. 17–19 depict operation opening and closing the film cassette compartment of the camera.

The camera 10 of this invention preferably includes a film cassette 20, a film spool (not shown) and a film exposing area (not shown). An exemplary film spool and film exposing areas are shown in commonly assigned co-pending applications, entitled "Camera With Combined Film Advance Rewind Mechanism" Ser. No. 09/400,965, which is hereby incorporated by reference, co-pending application entitled "Camera With Rewind Interlock" Ser. No. 09/400, 951, which is also hereby incorporated by reference and in the Kodak™ Advantix™ Camera. The film cassette compartment 20, the film spool and the film exposing area together define a film path 22, a portion of which is shown in FIGS. 2–9, through which film travels in the camera. These aspects of the camera are not in and of themselves novel, but may be used in combination with the novel features of this invention described below. The film cassette compartment 20 is disposed on one end of the camera and is capable of receiving a film cassette 14, as shown in FIG. 1. Preferably, the film cassette compartment 20 conforms to the shape of an APS film cassette 14, so that an APS film may be inserted into the compartment 20. Disposed beneath the film cassette 14 compartment 20 may be hinged door 24 or the like which can be opened and closed in order to insert and remove a film cassette 14 to and from the film cassette compartment 20. When the hinged door 24 is closed, the film cassette 14 is light sealed within the camera 10. the structure for light sealing the film cassette compartments 20 need not be a hinged door 24 and may be a tab or any other light sealing structure. The the film cassette compartment 20 may be defined at least in part by a main body 26 of the camera 10, as shown in FIGS. 1 and 2, and/or other camera structure, such as a front and back cover.

The film spool is preferably disposed on an end of the camera, that opposes the end in which the film cassette compartment 20 is disposed. Disposed between the film cassette compartment 20 and the film spool is the film exposing area. The film exposing are may be defined by a pair of film rails or the like. Film is exposed as it rests within the film exposing area. Preferably, film exits a loaded film cassette 14 and enters the film exposing area. From the film exposing area, the film moves to the film spool.

In a preferred embodiment of this invention, the leading edge of the film is thrust from the film cassette 14 and into the film exposing area after the film cassette 14 has been light sealed within the film cassette compartment 20. The leading edge is thrust to the film spool and wound around the film spool. The first frame of film rests in the film exposing area. After a picture is taken with the camera, the film is advanced one frame and the exposed film moves from the film exposing area to the film spool. This process continues until all of the film has been exposed. The film is then moved from the film spool across the film exposing area and back into the film cassette 14. In an alternative embodiment, the film may be preloaded onto the film spool and pictures are taken as the film is rewound into the film cassette.

Figure 4:
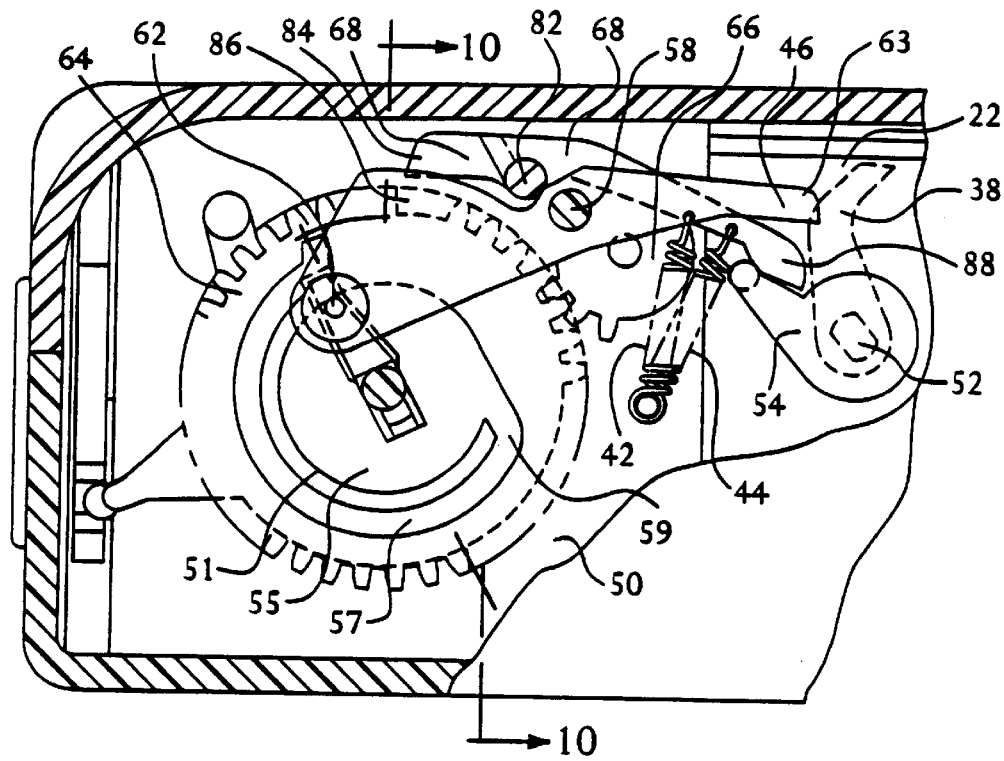
FIG. 4 is a top view depicting the parking mechanism of FIG. 2 with the film stored inside of the film cassette.

The camera 10 of this invention preferably further includes a film sensor 38, a linkage 54, a first spring 42, a second spring 44, a parking lever 46 and an advance wheel gear 50, and an advance wheel 51 as shown in either FIGS. 2–4. The film sensor 38 is preferably rotatably mounted to the camera, as shown in FIGS. 2 and 3, about a pivot stem 52. Also rotatably mounted to the stem 52 is a linkage 54. Preferably, the stem 52 is integrally formed with the linkage 54. This linkage 54 rotates with the stem 52 in response to movement of the film sensor 38. As described in further detail below, the film sensor 38 extends into the film path 22, so that it can sense the presence or absence of film within the film path 22. By sensing the absence of film within the film path 22, the film sensor 38 moves to control other components of the camera to close the light lock door 19 of the film cassette 14 and operate the parking lever 46.

Disposed within the camera 10 may also be a mechanism 51 for moving the film between the film cassette compartment 20 and the film spool. A variety of mechanisms may be employed and preferably the mechanism 51 is a manually operated mechanism. For example, a rotatable serrated wheel, commonly referred to as a thumb wheel, may be used. Cranks and the like may also be used. A description of the manual mechanism 51 shown in FIG. 3A along with a description of various other aspects of a camera with which this invention may be employed is provided in the above incorporated by reference commonly assigned copending application entitled "Camera With Combined Film Advance/ Rewind Mechanism" Ser. No. 09/400,965. Preferably, at least part of the mechanism 51 is disposed above the film cassette compartment 20, so that the mechanism 51 may be coupled to the spindle 16 of the film cassette 14. By coupling the mechanism to the spindle 16 of the film cassette 14, film may be thrust from the film cassette 14 into the film path and pulled back into the cassette 14. The mechanism may further be coupled to the film spool, so that the mechanism 51 can rotate the film spool to move the film along the film path and between the film cassette 14 and the film spool. In the embodiment shown, the mechanism 51 may be used to advance and rewind film. In an alternative embodiment, a separate mechanism may be used.

Figure 3A:
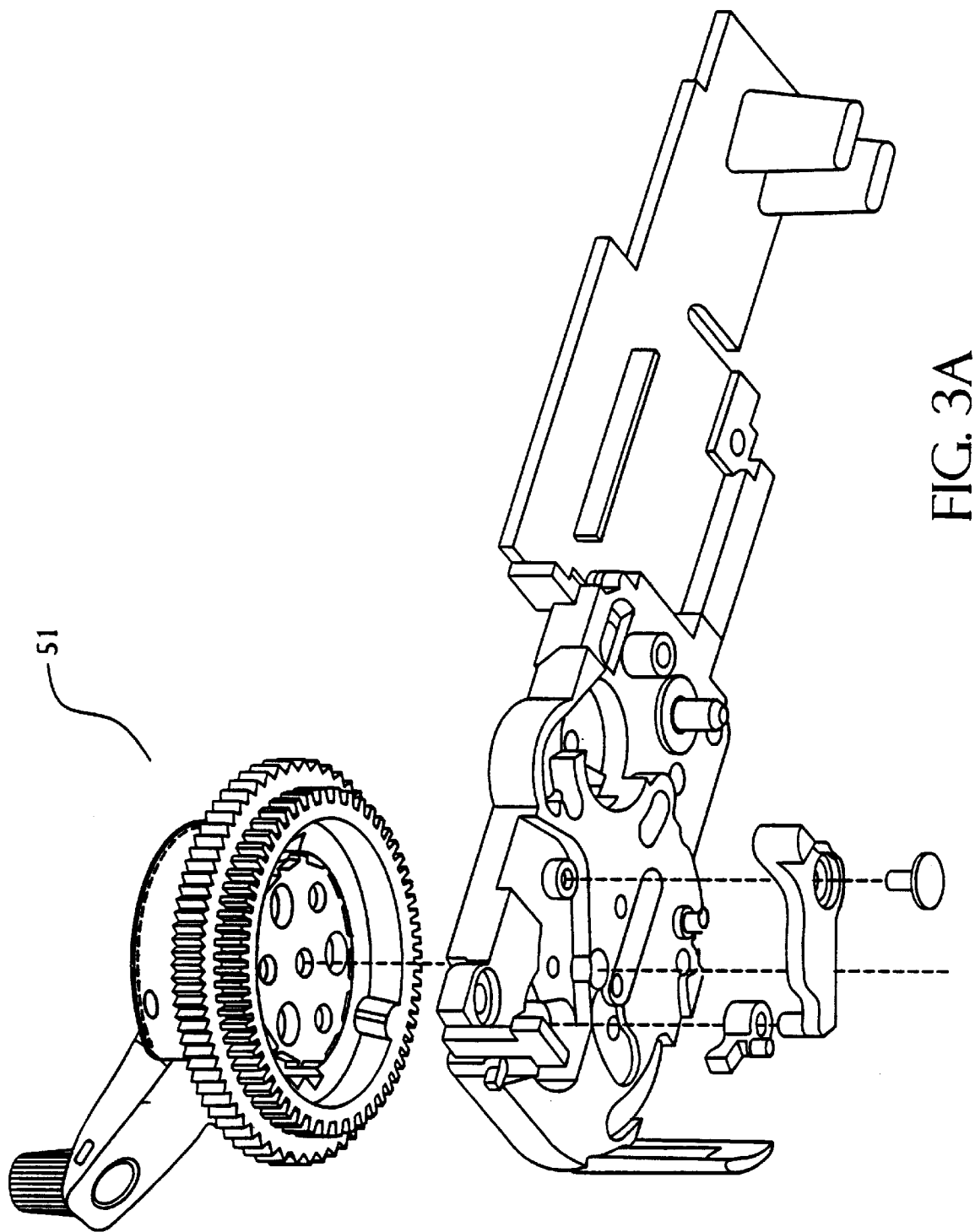
FIGS. 3A and 3B are assembly drawings of a preferred embodiment of the advance mechanism to be used with the parking mechanism of FIG. 2.
Figure 3B:
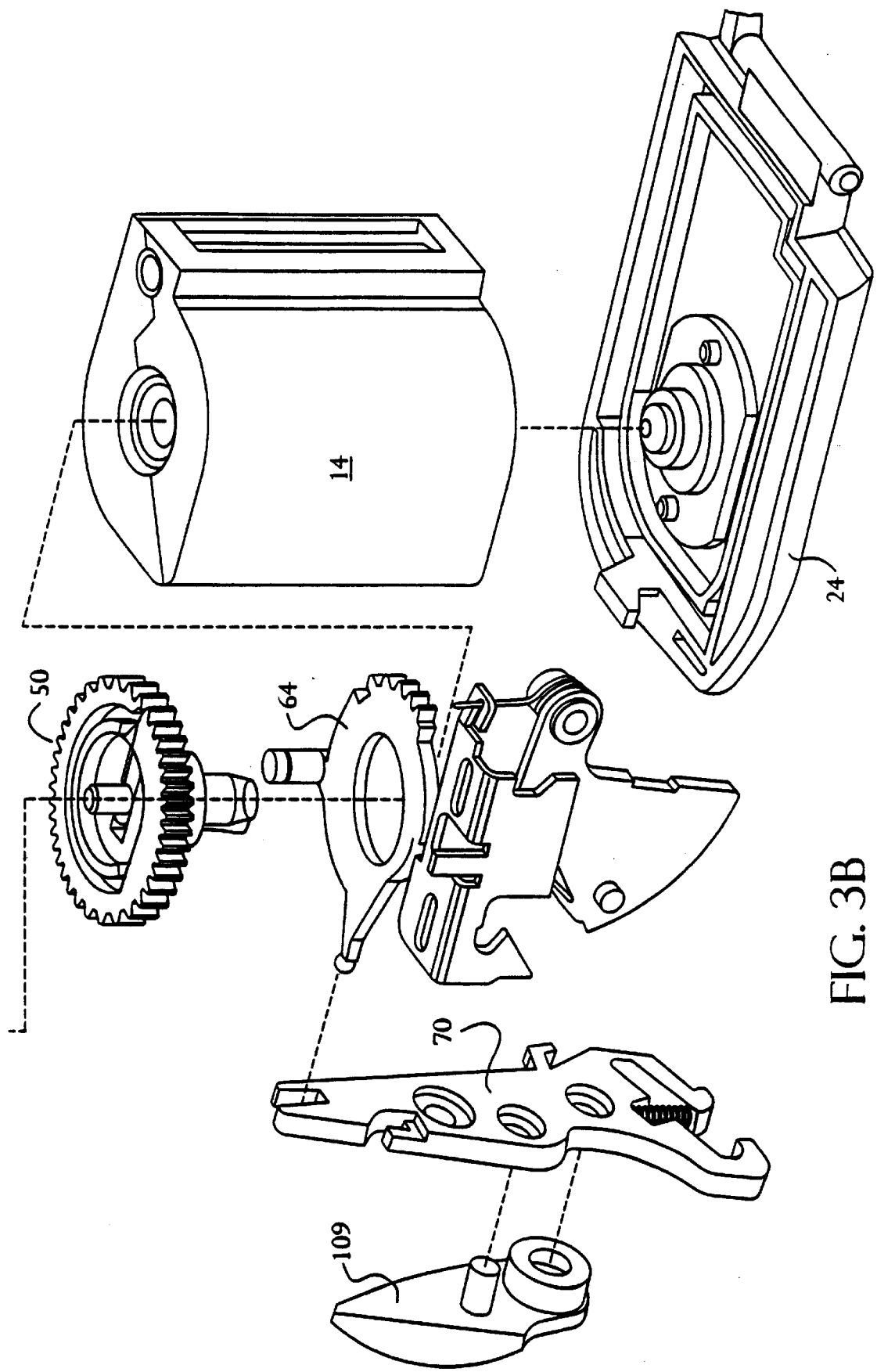

Part of the mechanism 51 for moving film may be an advance wheel gear 50. This advance wheel gear 50 is preferably coupled to the advance mechanism 51, that is used to move the film, as shown in FIGS. 3A and 3B, and rotates with the advance mechanism 51. As shown in FIGS. 2 and 4, an inner periphery 51 of a wall of the wheel gear 50 defines a cavity 55. Disposed within the wheel gear 50 may be a cam slot 57. This slot 57 has an entrance 59, an exit 61 through which a pin of the parking lever 46 passes and a pocket 65, as is described below. The cam slot 57 preferably extends about 180 to 300 degrees around the disk, so that the entrance 59 and exit 61 are spaced apart by about this much. As explained below, this ensures that the wheel gear 50 will be rotated far enough to move the VEI 12 of the cassette 14 to the parked position after the light lock door 19 of the film cassette 14 has been closed.

Figure 5:
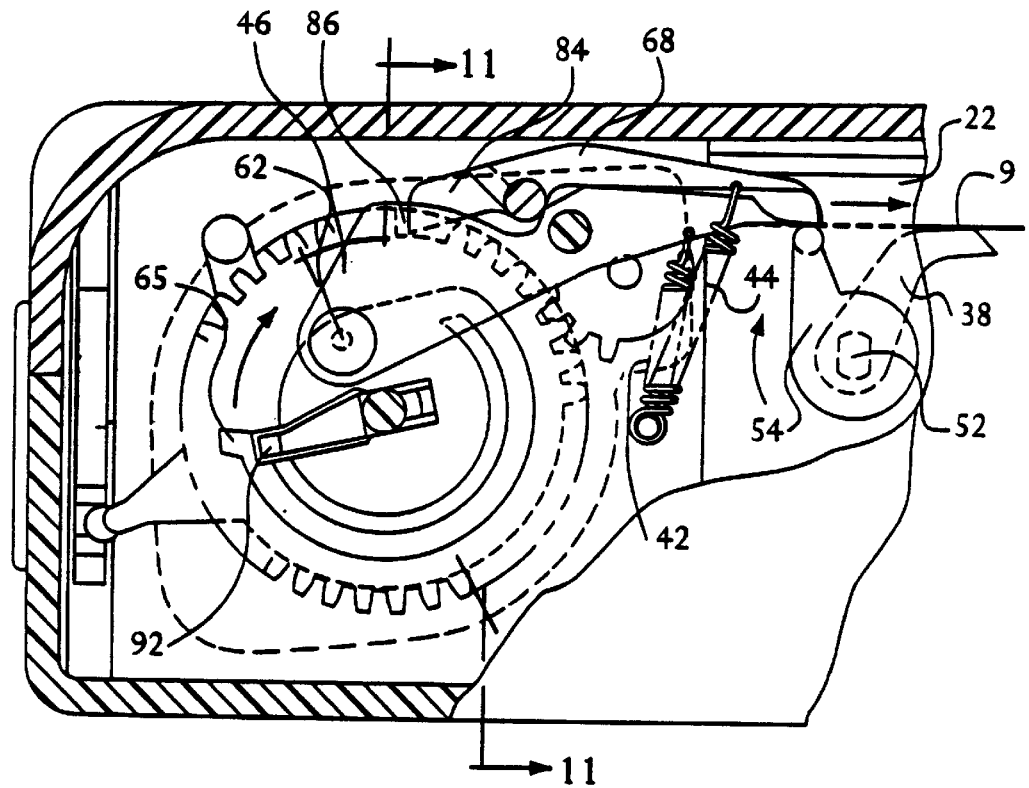
FIG. 5 is a top view depicting the parking mechanism of FIG. 2 with the film thrust from the film cassette.

As alluded to above, the camera 10 preferably includes a parking lever 46. The parking lever 46 is preferably rotatably mounted to the camera about a pivot 58, as shown in FIGS. 2 and 3. Disposed on a first end 60 of the parking lever 46 may be a parking pin 62. This parking pin 62 may be coupled to the parking lever 46 with any of a variety of mechanisms or be integrally formed with the parking lever 46. The parking lever 46 is disposed, so that a first end 60 of the parking lever 46 is disposed proximal to the wheel gear 50, and a second end 63 of the parking lever 46 is disposed proximal to the linkage 54. In this position, the parking lever 46 is engagable with the linkage 54, so that the parking lever 46 can move in response to movement of the film sensor 38 and the linkage 54. As shown in FIG. 5, the parking pin 62 of the parking lever 46 is disposed within the cavity 55 defined by the wheel gear 50 when film is disposed within the film path 22 and film is moving along the film path 22. So long as the film sensor 38 is disposed within the film path 22, the film sensor 38 will sense the presence of film and the wheel gear 50 will rotate with the parking pin 62 remaining stationary within the cavity 55. As is explained in detail below, once the film sensor 38 no longer senses the presence of film within the film path 22, the parking pin 62 will move into the cam slot 57 and the cam slot 57 will travel with respect to the pin 62, as film is rewound into the cassette 14. Eventually, the parking pin 62 will enter the pocket 65 and lock the wheel gear 50, so that the wheel gear 50 can no longer be rotated. At this point the camera user will no longer be able to move the mechanism 51 that moves the film, because the mechanism 51 is coupled to the wheel gear 50. As is explained below, at this point the spindle 16 of the film cassette 14 has been rotated sufficiently to ensure that the VEI 12 has moved to the "x" position. Thus, by preventing further rotation of the wheel gear 50 the parking lever 46 indicates to a camera user that the film cassette is in the parked position and ready to be removed from the camera.

A first spring 42, as shown in FIG. 4, may be mounted to the camera 10, to the parking lever 46 and proximate to the second end 63 of the parking lever 46. In a preferred embodiment, the first spring 42 is a helical spring. As shown in FIG. 4, the first spring 42 biases the parking lever 46 to rotate in the clockwise direction about the pivot 58.

The camera may further include a segmented gear 64, a light lock door driver 66, an interlock lever 68 and an actuator 70, as shown in FIG. 3. The light lock door driver 66 is preferably rotatably mounted to the camera and positioned so that it is engageable with the light lock door drive 66 of the film cassette 14 when the film cassette 14 is inserted into the film cassette compartment 20. Rotation of the light lock door driver 66, rotates the light lock door drive 17 to open and close the light lock door 19. Such drivers are known in the art. For example, a similar driver is disclosed in commonly assigned U.S. Pat. No. 5,689,733, issued on Nov. 18, 1997, which is hereby incorporated by reference.

The segmented gear 64 is preferably rotatably mounted to the camera above the film cassette compartment 20. The geared portion of the segmented gear 64 is engagable with the light lock door driver 66, so that the segmented gear 64 can drive the light lock door driver 66 to move the light lock door 19 between the open and closed positions. The segmented gear 64 is not however, coupled to the wheel gear 50, so the segmented gear 64 does not move in response to movement of the wheel gear 50 and the film.

Extending from the periphery of the segmented gear 64 is a finger 74, as shown in FIG. 3, for engaging the actuator 70. An end of the finger 74 is preferably spherical shaped. As shown in FIGS. 2 and 3, the actuator 70 is rotatably mounted to the side of the camera and includes a forked end 76. The finger 74 is disposed in the forked end 76 with the spherical end holding the finger 74 within the forked end 76, so that the segmented gear 64 is coupled to the actuator 70. A variety of other fastening techniques may be used to couple the segmented gear 64 to the actuator 70. Preferably, the segmented gear 64 rotates with the movement of the actuator 70.

At the bottom of the camera is the hinged door 24 that covers the film spool compartment 20. Extending from the hinged door 24 may be a tab 78 that engages the actuator 70 to rotate the actuator 70, the segmented gear 64, the light lock door driver 66 and the light lock door 19, as the hinged door 24 is closed, as shown in FIGS. 16–18 and as explained in detail below. Neither the hinged door 24 nor the actuator 70 themselves are new. For example, they may be found in the Kodak™ Advantix™ Camera manufactured by the assignee of this invention. After a film cassette 14 is inserted into the camera, the hinged door 24 is closed. When the hinged door 24 moves to the closed position causes, the hinged door 24 engages the actuator 70 to drive the actuator 70 to rotate. As the actuator 70 rotates, the segmented gear 64 rotates. The segmented gear 64 drives the light lock door driver 66 to rotate the light lock door 19 of the film cassette 14 to the open position.

Figure 8:
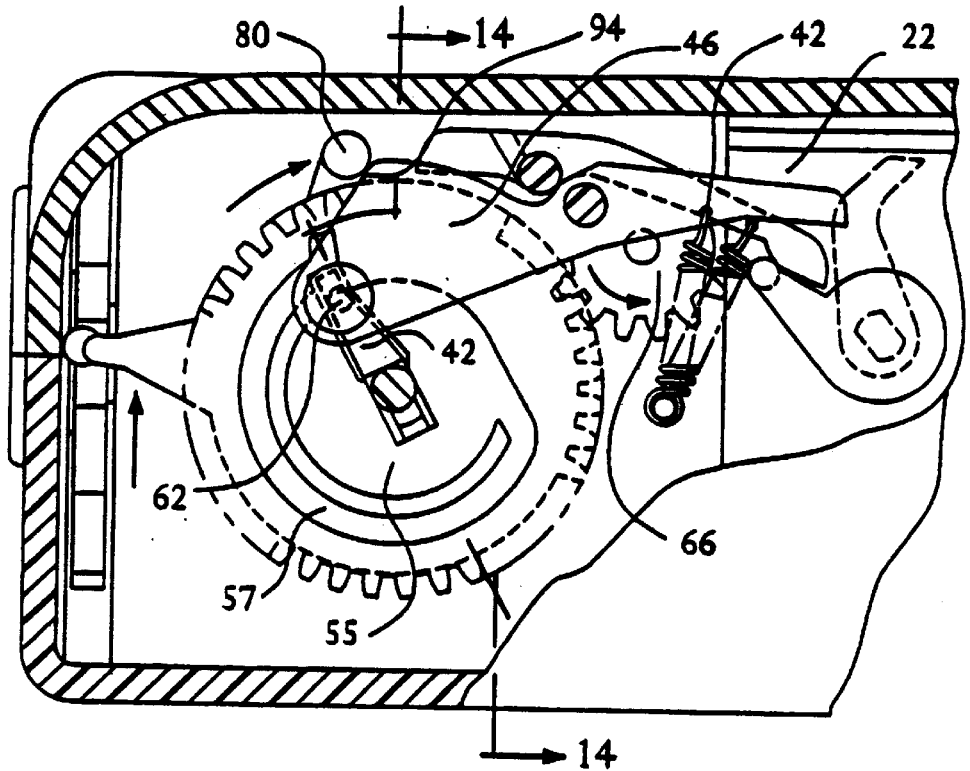
FIG. 8 is a top view depicting the parking mechanism of FIG. 2 as the door of the film cassette compartment is being opened.
Figure 9:
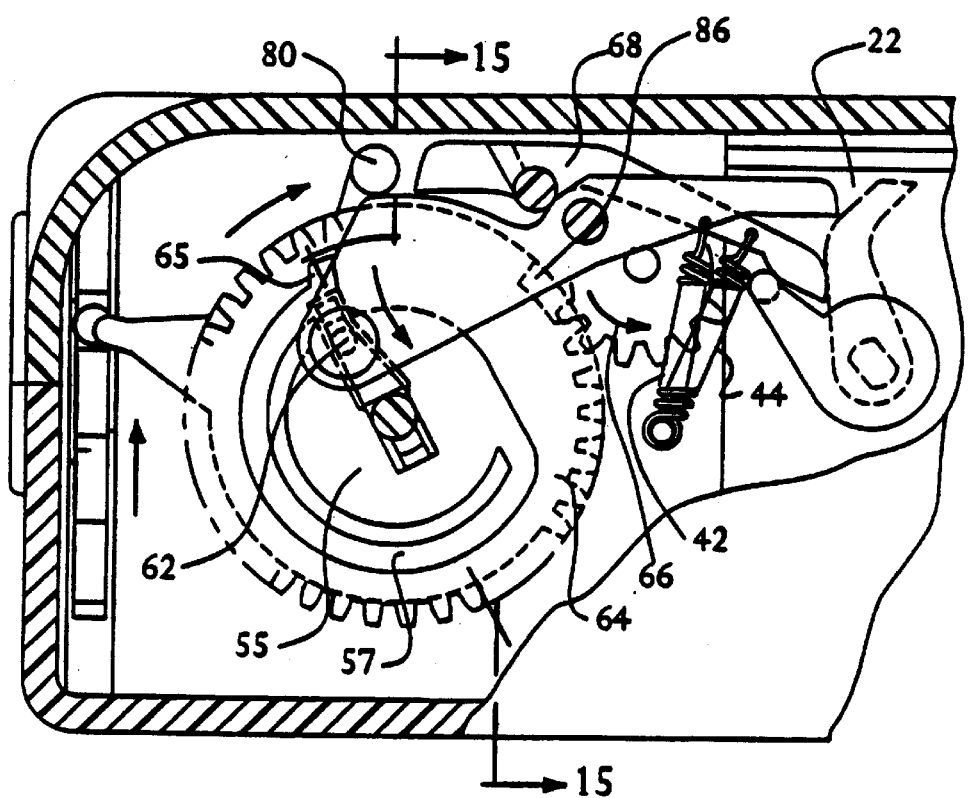
FIG. 9 is a top view depicting the parking mechanism of FIG. 2 when the door of the film cassette compartment is opened.

Extending from the periphery of the segmented gear 64 may be a pin 80, as shown in FIGS. 2 and 3. This pin 80 rotates with the segmented gear 64 and is engageable with the parking lever 46, as the segmented gear 64 rotates, as shown in FIGS. 8 and 9. When rotated in the clockwise direction, the pin 80 pushes the parking lever 46 against the bias of the first spring 42 to rotate the parking lever 46. When rotated by the segmented gear 64, the parking lever 46 rotates in the counter clockwise direction and the attached parking pin 62 moves out of the pocket 65 of the cam slot 57 and into the cavity 55 defined by the wheel gear 50.

An interlock lever 68 may further be included within the camera and rotatably mounted to the camera about a pivot pin 82, as shown in FIGS. 2 and 3. The interlock lever 68 has a first end 84 which is engageable with a recess 86 disposed within the periphery of the segmented gear 64. A second end 88 of the interlock lever 68 is engageable with the linkage 54, so that the interlock lever 68 can move in response to movement of the linkage 54 and the film sensor 38. When the first end 84 of the interlock lever 68 is disposed within the recess 86, the segmented gear 64 cannot be rotated, and therefore, the position of the light lock door driver 66 and light lock door 19 cannot be changed. Conversely, when the first end 84 of the interlock lever 68 is not disposed within the recess 86, the segmented gear 64 can be rotated, and therefore, the position of the light lock door driver 66 and light lock door 19 can be changed. The interlock lever 68 is moved into the recess 86 when the film sensor 38 moves in response to sensing film within the film path 22. This prevents opening the hinged door 24 and exposing the film to light when film has been thrust out of the film cassette 14.

Figure 10:
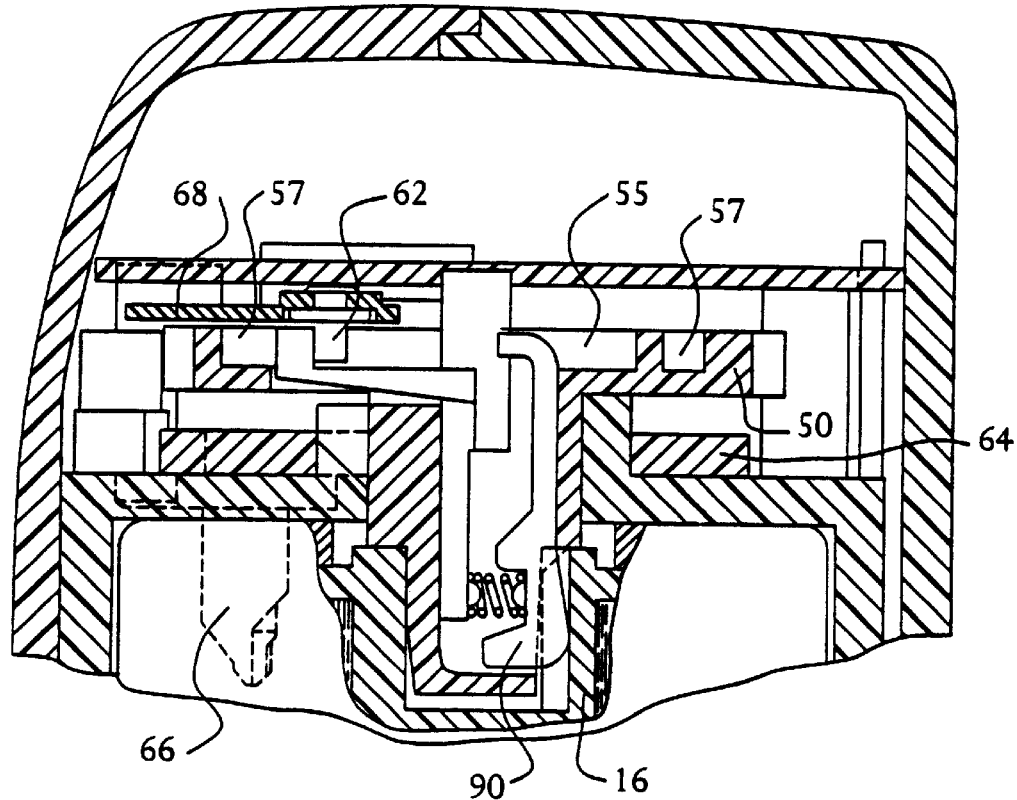
FIG. 10 is a cross section taken along line 10—10 of FIG. 4.

Disposed within the cavity 55, as best understood with reference to FIG. 10, is the spindle key 90 which engages the spindle 16 of the film cassette 14 and is coupled to the mechanism for moving the film. Such a mechanism rotates the spindle key 90 to rotate the spindle 16 of the film cassette 14 to move film into and out of the film cassette 14.

Coupled to the spindle key 90 may be a flexible hook 92 that acts as a cantilever. As is explained below, the hooked end 92 rotates with the spindle key 90 and the wheel gear 50 and functions to hold the parking pin 62 of the parking lever 46 within the cam slot 57, once the parking pin 62 enters the cam slot 57. As is also explained below, rotation of the segmented gear 64 pushes the pivot pin over the hook 92 and back into the cavity 55 when the hinged door 24 is opened.

The end of the actuator 70 opposite that of the forked end 76 preferably has a first arm 100 and a second arm 101, as shown in FIGS. 2 and 3. As is shown in FIGS. 2 and 17–19, the first arm 100 is preferably biased by a spring 103 that is coupled to the body of the actuator 70 and the first arm 100. The spring 103 preferably biases the first arm 100 to rotate clockwise away from the body of the actuator 70. As is shown in FIGS. 2 and 17–19, the second arm 101 cooperates with the tab extending from the hinged door 24 to hold the hinged door 24 in the closed position.

A door spring 105 is preferably coupled to the camera body and the actuator 70 to bias the actuator 70 to rotate in the clockwise direction, as shown for example in FIGS. 3 and 17. A notch 107 is preferably disposed on the camera, as shown in FIG. 3. The notch 107 holds the first arm 100 when the actuator 70 is rotated against the bias of the door spring 105 to hold the actuator 70 against the bias of the door spring 105. A door lever 109, as shown in FIGS. 2 and 3, may be disposed on a side of the camera and coupled to the actuator 70. The camera user can push the door lever 109 to rotate the actuator 70 and thereby open the hinged door 24 and shut the light lock door 19 of the film cassette. The door lever 109 is interlocked with the hinged door 24 and the light lock door driver 66 to prevent a camera user from opening the hinged door 24 when film extends from the light lock door 19 and thereby prevents unwanted exposure of film. The camera user can only manipulate the actuator 109 to open the hinged door 24 when the film sensor notes the absence of film within the film path. Further operation of the actuator 70, the hinged door 24 and the light lock door driver 66 are described below.

Operation of Parking Mechanism

The operation of the camera of this invention is as follows. Prior to insertion of a film cassette 14 into the camera, the components of the camera are in the positions shown in FIGS. 9, 15 and 18. As shown in FIG. 18, the hinged door 24 is open and the actuator 70 is rotated counter clockwise. As is further shown in FIG. 9, the segmented gear 64 is rotated to engage the parking lever and the parking pin 62. The parking pin 62, as best understood with reference to FIG. 15, is disposed within the cavity 55 of the wheel gear 50. In this position, the wheel gear 50 is free to rotate about the pin 62. The interlock lever 68 is biased by the second spring 44 to its clockwise position out of the recess 86, so that the segmented gear 64 can rotate and drive the light lock door driver 66.

When the film cassette 14 is inserted into the camera, the light lock door drive 17 engages the light lock door driver 66 and the spindle 16 engages the spindle key 90, as shown in FIG. 10. In order to light seal the film cassette 14 within the film cassette compartment 20, the hinged door 24 is moved toward the closed position, as shown in FIG. 19. As the hinged door 24 is closed, the tab 78 of the hinged door 24 engages the actuator 70 to cause the actuator 70 to push the first arm 100 of the actuator 70 against the bias of the spring 103, as shown in FIG. 19. Once the tab 78 pushes the first arm 100 above the notch 107, the actuator 70 rotates clockwise due to the door spring 105 to the position shown in FIG. 17. As the actuator 70 rotates, the second arm 101 engages the tab 78 and rests underneath the tab 78 to prevent opening of the hinged door 24 unless the actuator 70 is rotated. Further, once the actuator 70 rotates the first arm 100 is pushed by the spring 103 to rest against the notch 107, as shown in FIG. 17.

Closing of the hinged door 24 also causes the light lock door 19 of the film cassette 14 to open. Since the finger of the segmented gear 64 couples the segmented gear 64 to the actuator 70, the segmented gear 64 rotates with the actuator 70 from the position of FIG. 9 to the position of FIG. 4. Rotation of the segmented gear 64 causes rotation of the light lock door driver 66, as is best understood by comparing FIGS. 4 and 9, and hence movement of the light lock door 19 to the open position. Since the camera is light sealed by the closing of the hinged door 24, light cannot enter the film cassette 14 to expose the film.

Immediately after insertion of the film cassette, the camera components are positioned as shown in FIGS. 4 and 10. As shown in FIG. 10, the parking pin 62 is disposed within the cavity 55 of the wheel gear 50. If desired the door lever 109 could be manipulated to close the light lock door 19 and open the hinged door 24. Once the film is thrust from the film cartridge, the interlock described below is created which prevents closing the light lock door 19 and opening the hinged door 24 until the film is rewound into the cassette. This prevents the accidental exposure of film.

Following insertion of the film cassette and closing of the light lock door 19, the advancing mechanism 51 for moving film is manipulated to thrust film out of the film cassette 14 and into the film path 22. When the leading edge of the film 9 reaches the film sensor 38, the film sensor 38 is pushed by the film 9 to rotate in the clockwise direction, as shown in FIG. 5. Rotation of the film sensor 38 causes rotation of the linkage 54 about the stem 52, which is best understood by comparing FIGS. 4 and 5.

As the linkage 54 rotates, the linkage 54 contacts the interlock lever 68 to cause the interlock lever 68 to rotate against the bias of the second spring 44 in the counter clockwise direction. The interlock lever 68 rotates until the first end 84 of the interlock lever 68 is disposed within the recess 86. Because the first end 84 of the interlock lever 68 is being held in the recess 86 by the film sensor 38, the segmented gear 64 cannot be rotated. At this point an interlock is defined which prevents opening the hinged door 24 and exposing the film to light. The interlock includes the hinged door 24, the actuator 70, the segmented gear 64, the interlock lever 68, the film sensor 38 and the linkage 54. Because the segmented gear 64 cannot be rotated, the actuator 70 cannot be rotated and the hinged door 24 cannot be opened.

Thus, once film is sensed within the film path by the film sensor 38, the hinged door 24 cannot be opened to expose the film to light. Thus, this interlock prevents a camera user from accidentally opening the hinged door 24 and exposing the film.

Figure 11:
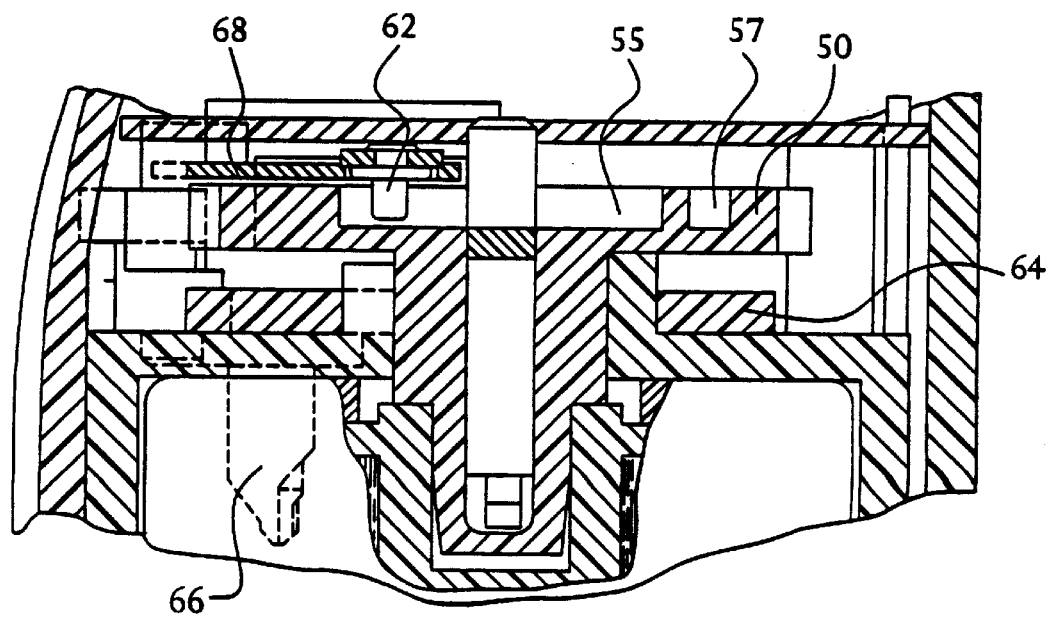
FIG. 11 is a cross section taken along line 11—11 of FIG. 5.

When the linkage 54 rotates, the linkage 54 also contacts the parking lever 46 and pushes the parking lever 46 to rotate in the counter clockwise direction against the bias of the first spring 42, as shown in FIG. 5. In this rotated position, the parking pin 62 rests within the cavity 55, as shown in FIG. 11, and remains stationary as the film is thrust and the wheel gear 50 rotates with the advancing mechanism 51. The film is thrust until the film leader is wrapped around the film spool and the first frame of film is disposed within the film exposing area. At this point the camera is ready for use and pictures are sequentially taken. The film is advanced after each exposure from the film exposing area to the film spool, and the next frame to be exposed is advanced from the cassette 14 to the film exposing area. As the film is advanced, the wheel gear 50 rotates and the pin 62 rests within the cavity. After all of the exposures are taken, or the desired number of exposures are taken, the film is rewound into the film cassette 14.

In an alternative embodiment of this invention, all of the film can first be advanced from the film cassette 14 to the film spool and then the film can be exposed. In this embodiment, the film is moved from the film spool to the film cassette 14 after each exposure.

Once the cassette light lock door 19 has been opened and the film has been thrust from the cassette 14 into the film path, the VEI 12 moves from the circle position to the half circle position. This signifies that at least a portion of the film has been withdrawn from the cassette 14.

Figure 6:
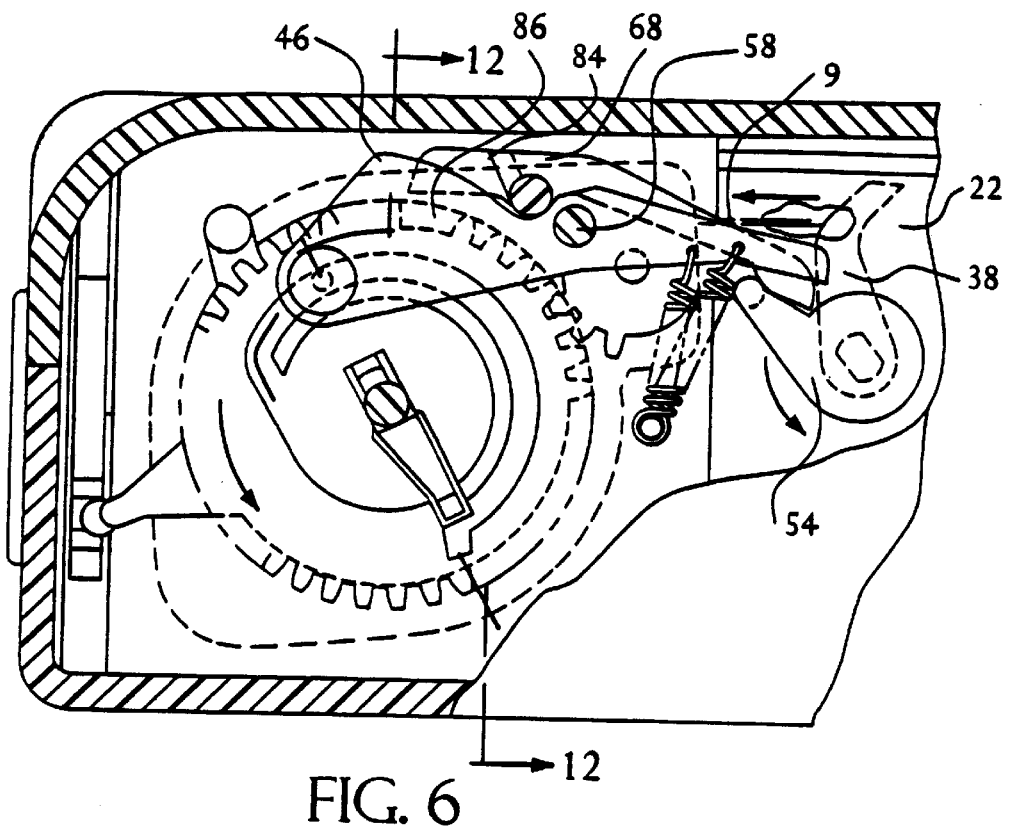
FIG. 6 is a top view depicting the parking mechanism of FIG. 2 as the trailing edge of the film is being rewound into the film cassette.

After the last exposure is taken and the film 9 is being rewound into the cassette 14 with the advancing mechanism 51, the trailing edge of the film will reach the film sensor 38. Right after the trailing edge of the film 9 passes the film sensor 38, the film sensor 38 is released and rotates in the counter clockwise direction, as shown in FIG. 6. The linkage 54 rotates counterclockwise with the film sensor 38. When the linkage 54 rotates, the linkage 54 releases both the interlock lever 68 and the parking lever 46. The first spring 42 and the second spring 44 cause the parking lever 46 and the interlock lever 68 respectively to rotate in the clockwise direction.

Figure 12:
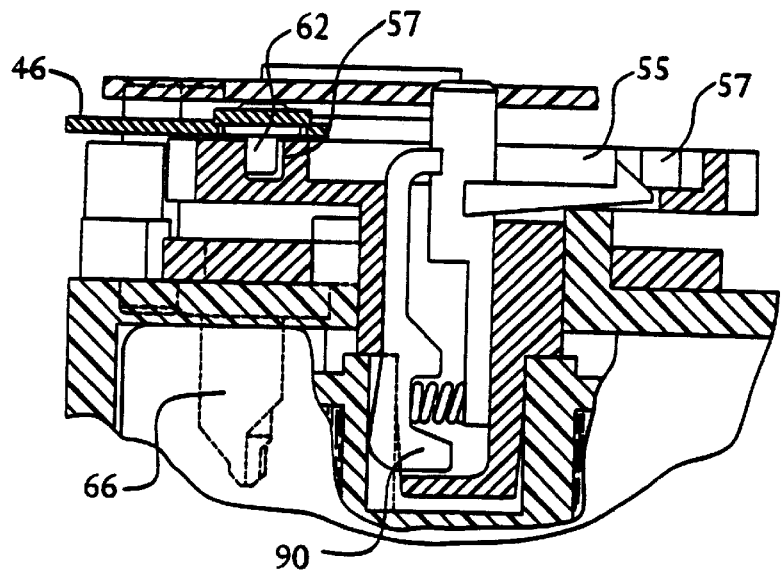
FIG. 12 is a cross section taken along line 12—12 of FIG. 6.

When the interlock lever 68 rotates clockwise, the first end 84 of the interlock lever 68 rotates out of the recess 86 and the interlock is defeated. As the parking lever 46 rotates, the pin 62 rotates against the inner periphery of the wheel gear 50 and toward the cam slot 57. Once the wheel gear 50 is rotated into a position where the entrance 59 of the cam slot 57 is disposed proximal to the parking pin 62, the bias of the first spring 42 forces the parking pin 62 into the cam slot 57, as shown in FIGS. 6 and 12. At this point, the film is still in the film path and the VEI 12 is still in the half circle position. Further operation of the advancing mechanism winds the trailing edge of the film into the film cassette 14. At this point, the parking pin 62 will be disposed somewhere within the cam slot 57. Depending upon tolerances the VEI 12 may move to the "x" position as the trailing edge of the film enters the film cassette 14. However, in order to ensure the VEI 12 moves to the "x" position, the camera user continues to operate the advancing mechanism and rotates the spindle 16 of the film cassette 14.

Figure 7:
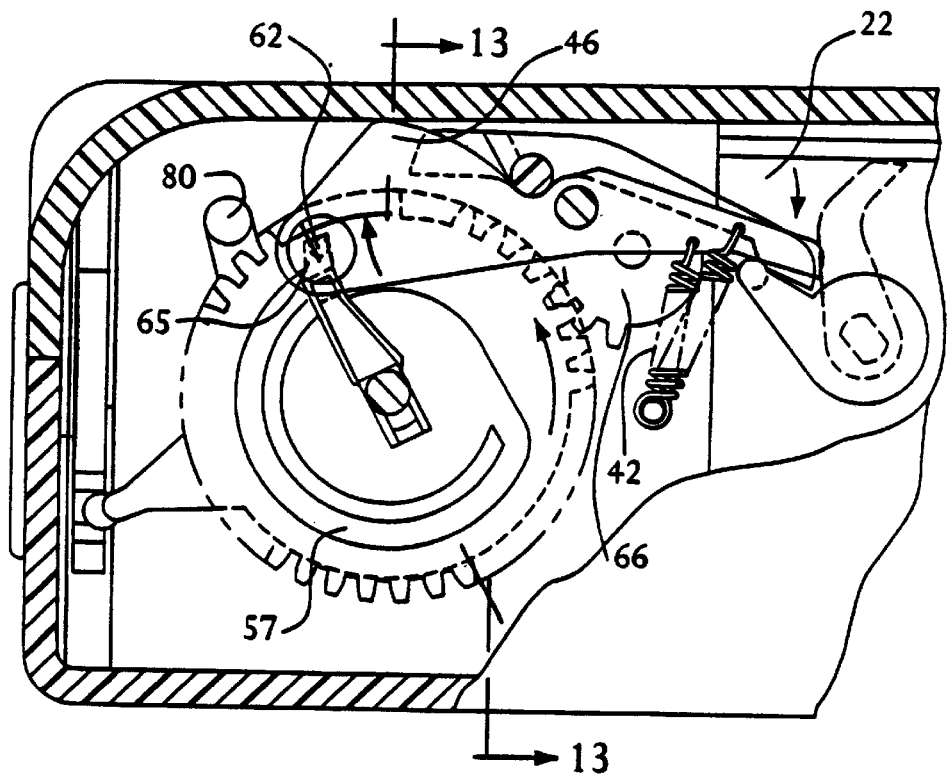
FIG. 7 is a top view depicting the parking mechanism of FIG. 2 in the parked position.
Figure 13:
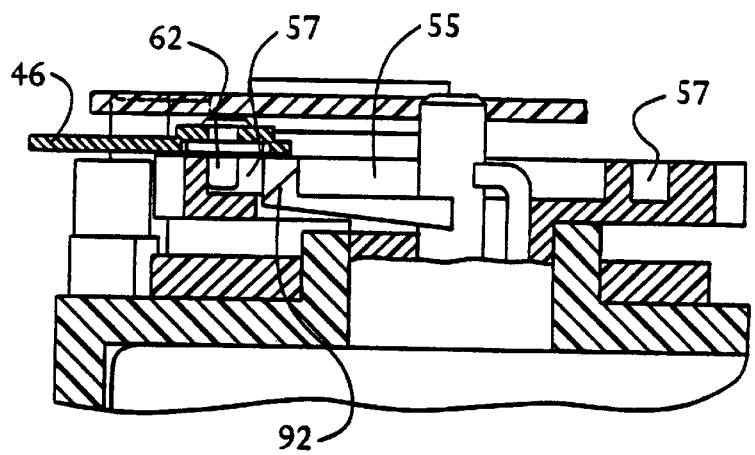
FIG. 13 is a cross section taken along line 13—13 of FIG. 7.

As the advancing mechanism is manipulated, the cam slot 57 rotates with the wheel gear 50 and the parking pin 62 remains stationary within the cam slot 57. Eventually, the wheel gear 50 is rotated until the pocket 65 of the cam slot 57 reaches the parking pin 62, and the pocket 65 moves proximate to the parking pin 62. The bias of the first spring 42 causes the pin 62 to move into the pocket 65, as shown in FIGS. 7 and 13. At this point, the advancing mechanism can no longer be rotated because the parking pin 62 and the parking lever 46 prevent movement of the wheel gear 50, and the camera user is ensured that the VEI 12 has moved to the parked or "x" position.

The VEI 12 must move to the parked position because of the relationship between the length of the film extending from the film cassette 14 when the parking pin 62 enters the cam slot 57, the length of the cam slot 57 and the distance the film travels per revolution of the spindle 16. The cam slot 57 is long enough to ensure that the spindle of the film cassette 14 rotates sufficiently to move the film leader within the film cassette 14 and move the VEI 12 to the parked position. In a preferred embodiment, the cam slot is above 180 to 240 degrees. Thus, in the embodiment shown, the parking mechanism is defined by the parking lever 46, the wheel gear 50 with the cam slot 57 and the parking pin 62. The parking mechanism may further include the first spring 42.

After the film has been rewound into the film cassette 14, the film cassette compartment door 24 may be opened, because the interlock has been defeated by rotation of the interlock lever 68, as described above. Rotating the door lever 109 coupled to the actuator 70, as described in detail below, causes the door 24 to move from the closed position of FIG. 17 to the opened position of FIG. 18. As the door 24 is opened, the actuator 70 is released and causes the segmented gear 64 to rotate clockwise, as shown in FIGS. 8 and 18. Rotation of the segmented gear 64 rotates the light lock door driver 66 and the light lock door drive 17 to close the light lock door 19 of the film cassette 14 to prevent exposing the film to light. This is best understood with reference to FIG. 8, which shows some of the components of the camera as the door 24 is being opened. When the segmented gear 64 rotates in the clockwise direction, the pin 80 extending from the segmented gear 64 contacts the parking lever 46, and in particular the cammed surface 94 of the parking lever 46. The pin 80 pushes on the parking lever 46 and rotates the parking lever 46 counter clockwise against the bias of the first spring 42. As the parking lever 46 rotates, the parking pin 62 contacts the flexible hinge 92 as shown in FIGS. 8 and 14, which retains the parking pin 62 in the pocket 65. The force of the segmented gear 64 on the parking lever 46 is sufficient to cause the flexible hinge 92 to flex downward as the parking pin 62 pushes against the hinge 92. The parking pin 62 passes over the hinge 92 and moves from the pocket 65 of the cam slot 57 to the cavity 55, as shown in FIGS. 9 and 15, as the hinged door reaches the open position. In this position the parking pin 62 is reset and the camera is ready for another film cassette 14 to be inserted.

In addition to resetting the parking pin, rotation of the door lever 109 opens the hinged door 24 as follows. As shown by comparing FIGS. 18 and 19, the rotation of the door lever 109 against the bias of the door spring 105, causes the first arm 100 to slide along the notch 107 and the second arm 101 to move away from the tab 78 of the hinged door 24. Eventually, the second arm 101 becomes disengaged from the tab 78 and the hinged door 24 is free to open. Further, the first arm 100 also rotates past the notch 107 and the spring 103 biases the first arm 100 to move to engage the notch 107, as shown in FIG. 18. With the hinged door 24 opened, the film cassette can be removed.

In summary, the camera of this invention includes a parking mechanism that ensures the VEI of the film cassette moves to the parked position. The parking mechanism indicates that the VEI has moved to the parked position by preventing further rotation of the advance mechanism 51 and the advance wheel gear 50 as the film is being rewound. In the embodiment shown, the parking mechanism includes an advance wheel gear 50, a parking lever and a parking pin 62. The actuator and the segmented gear form part of the mechanism for resetting the parking mechanism.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A camera of the type that employs a film cassette that has a light lock door and a visual exposure indicator, the visual exposure indicator having a parked position that indicates the film within the film cassette has been exposed, the camera comprising:
  a film cassette compartment, disposed on a first end of the camera, that can receive the film cassette;
  a film spool, disposed on a second end of the camera that opposes the first end of the camera, around which film can be wound;
  a film path, disposed between the film cassette compartment and the film spool, in which film is exposed and through which the film traverses as the film moves between the film cassette compartment and the film spool;
  a film wheel, disposed above the film cassette compartment, that is coupled to a spindle of the film cassette when the film cassette is inserted into the film cassette compartment, and that rotates with the spindle as the film is moved between the film cassette compartment and the film spool, the film wheel having an annular interior and a cam slot disposed within the wheel, the cam slot having an entrance disposed along an interior wall of the wheel and a pocket at an end of the cam slot;
  a parking lever, rotatably mounted to the camera and having a parking pin, the parking lever be positioned so that the parking pin is disposed within the cavity of the wheel; when film is disposed within the film path
  a film sensor, disposed within the film path and rotatably mounted to the camera; and
  a linkage, coupled to the film sensor and rotatably mounted to the camera so that the linkage rotates with the film sensor as the film sensor rotates, the film sensor and the linkage being rotated in a first direction by film within the film path contacting the film sensor, the linkage contacting the parking lever when rotated in the first direction to rotate the parking lever to position the pin within the cavity, the film sensor and the linkage rotating in a second direction when a trailing edge of the film passes the film sensor as the film is being rewound into the cassette, rotation of the linkage in the second direction releasing the parking lever to rotate and position the parking pin as the wheel is rotated to move the film within the cam slot, the pocket of the cam slot contacting the parking pin to prevent further rotation of the wheel and indicate that the visual exposure indicator has moved to the parked position.

2. The camera of claim 1, further comprising a parking spring, mounted to the camera and the parking lever, to bias the parking lever to rotate toward the interior wall.

3. The camera of claim 1, wherein a length of the cam slot is sufficient to ensure that the wheel is rotated sufficiently after the film is rewound into the film cassette and thereby ensure that the visual exposure indicator moves to the parked position.

4. The camera of claim 1, further comprising a flexible hook mounted within the cavity that prevents the pin from moving out of the pocket.

5. The camera of claim 4, further comprising a door that covers the film cassette compartment, an actuator rotatably mounted to the camera and a gear, rotatably mounted to the camera and coupled to the actuator, the actuator being coupled to the door when the door is closed and being rotatable to open the door for removal of the film cassette, the gear rotating with the actuator when the actuator is rotated to open the door, the gear contacting the parking lever when the gear rotates to push the parking lever and thereby push the parking pin over the flexible hook, out of the pocket and into the cavity, so that the wheel can be rotated when another film cassette is inserted into the film cassette compartment.

6. A camera of the type that employs a film cassette that has a light lock door and a visual exposure indicator, the visual exposure indicator having a parked position that indicates the film within the film cassette has been exposed, the camera comprising a film cassette compartment, disposed on a first end of the camera, that can receive the film cassette, a film spool, disposed on a second end of the camera that opposes the first end of the camera, around which film can be wound, a film path, disposed between the film cassette compartment and the film spool, in which film is exposed and along which the film travels as the film moves between the film cassette compartment and the film spool, and a film advancing mechanism, mounted to the camera and coupled to a spindle of the film cassette when the film cassette is inserted into the film cassette compartment, the camera comprising:
  a rotatable wheel mounted to the camera above the film cassette compartment, the wheel having an inner periphery, that defines a cavity, and a cam slot, disposed in a wall of the wheel, the cam slot having an entrance along the inner periphery and a pocket disposed at an end of the cam slot;
  a parking mechanism, mounted to the camera, and having a pin which rests within the cavity while film is being exposed; and
  a film sensor, rotatably mounted to the camera and disposed within the film path, the film sensor being contacted by film within the film path to cause the film sensor to rotate and hold the parking mechanism, so that the pin is disposed within the cavity and being released by the film as a trailing edge of the film passes the film sensor and enters the film cassette to cause the film sensor to rotate and thereby release the parking mechanism and cause the pin to move through the entrance of the cam slot and into the cam slot, further rotation of the wheel moving the cam slot until the pocket contacts the pin, the contact of the pocket preventing further rotation of the advance wheel and indicating that the film cassette is in the parked position.

7. The camera of claim 6, further comprising a parking spring that is coupled to the camera and the parking mechanism lever to bias the pin of the parking mechanism to rotate into the cam slot of the wheel.

8. The camera of claim 6, wherein a length of the cam slot is sufficient to ensure that the wheel is rotated sufficiently after the film is rewound into the film cassette and thereby ensure that the visual exposure indicator moves to the parked position.

9. The camera of claim 6, further comprising a linkage that is coupled to the film sensor to rotate with the film sensor and that engages the parking mechanism to rotate the parking mechanism when the film sensor is contacted by the film and thereby rotate the parking pin into the cavity.

10. The camera of claim 6, further comprising a flexible hook mounted within the cavity that prevents the pin from moving out of the pocket.

11. The camera of claim 10, further comprising a door that covers the film cassette compartment, an actuator rotatably mounted to the camera and a gear, rotatably mounted to the camera and coupled to the actuator, the actuator being coupled to the door when the door is closed and being rotatable to open the door for removal of the film cassette, the gear rotating with the actuator when the actuator is rotated to open the door, the gear contacting the parking mechanism when the gear rotates to push the parking mechanism and thereby push the pin over the flexible hook, out of the pocket and into the cavity, so that the wheel can be rotated when another film cassette is inserted into the film cassette compartment.

12. A camera of the type that employs a film cassette that has a light lock door and a visual exposure indicator, the visual exposure indicator having a parked position that indicates that all of the film within the film cassette has been exposed, the camera comprising a film cassette compartment, disposed on a first end of the camera, that can receive the film cassette, a film spool, disposed on a second end of the camera that opposes the first end of the camera, around which film can be wound, a film path, disposed between the film cassette compartment and the film spool, in which film is exposed and along which the film travels as the film moves between the film cassette compartment and the film spool, and a film advancing mechanism, mounted to the camera and coupled to a spindle of the film cassette when the film cassette is inserted into the film cassette compartment, the camera comprising:

a rotatable wheel mounted to the camera above the film cassette compartment, the wheel having an inner periphery, that defines a cavity, and a cam slot, disposed in a wall of the wheel, the cam slot having an entrance along the inner periphery and a pocket disposed at an end of the cam slot;

a parking lever, rotatably mounted to the camera, and having a parking pin disposed on a first end, the parking pin resting within the cavity while film is being thrust from the cassette and traveling into the cam slot while film is being rewound into the film cassette and being disposed in the pocket after the film has been rewound into the film cassette, to prevent further rotation of the rotatable wheel and indicate that the film cassette is in the parked position.

13. The camera of claim 12, wherein a length of the cam slot is sufficient to ensure that the wheel is rotated sufficiently after the film is rewound into the film cassette and thereby ensure that the visual exposure indicator moves to the parked position.

14. The camera of claim 12, further comprising a parking spring, mounted to the camera and the parking lever, to bias the parking lever to rotate to move the parking pin toward the inner periphery of the wheel.

15. The camera of claim 14, further comprising a linkage, rotatably mounted to the camera so that the linkage can contact the parking lever and rotate the parking lever against the bias of the parking spring.

16. The camera of claim 15, further comprises a film sensor, disposed within the film path, coupled to the linkage and rotatably mounted to the camera, the film sensor being rotated in a first direction by film disposed within the film path pushing the film sensor, the rotation of the film sensor causing rotation of the linkage so that the linkage contacts the parking lever to rotate the parking lever against the bias of the parking spring and thereby move the parking pin into the cavity, the film sensor rotating in a second direction when a trailing edge of the film passes the film sensor as the film is being rewound into the cassette, the linkage rotating with the film sensor to release the parking lever and rotate the parking lever so that the pin moves towards the cam slot.

17. The camera of claim 12, further comprising a flexible hook mounted within the cavity that prevents the pin from moving out of the pocket.

18. The camera of claim 17, further comprising a door that covers the film cassette compartment, a actuator rotatably mounted to the camera and a gear, rotatably mounted to the camera and coupled to the actuator, the actuator being coupled to the door when the door is closed and being rotatable to open the door for removal of the film cassette, the gear rotating with the actuator when the actuator is rotated to open the door, the gear contacting the parking lever when the gear rotates to push the parking lever and thereby push the parking pin over the flexible hook, out of the pocket and into the cavity, so that the wheel can be rotated when another film cassette is inserted into the film cassette compartment.

19. A method of ensuring that a visual exposure indicator of a film cassette of the type that has a light lock door moves to the parked position after the film has been exposed within a camera and the film is rewound into the film cassette, comprising:

passing a trailing edge of the film past a film sensor as the film is being rewound into the film cassette and thereby releasing the film sensor and an attached linkage to release a parking lever to rotate toward an interior surface of an advance wheel;

rotating the advance wheel to rewind all of the film into the film cassette and thereby moving a parking pin coupled to the film sensor into a cam slot of the advance wheel; and preventing further rotation of the advance wheel when an end of the cam slot contacts the parking pin and thereby indicating that the visual exposure indicator is in the parked position.

20. The method of claim 19, further comprising the steps of inserting a film cassette into a film cassette compartment of the camera prior to the step of passing and light sealing the film cassette compartment by placing a door over the film cassette compartment prior to the step of passing.

21. The method of claim 20, further comprising the step of thrusting film from the film cassette into the film path to contact the film sensor after the step of inserting and prior to the step of passing.

22. The method of claim 21, further comprising the step of opening the door to remove the film cassette from the film cassette compartment after the step of preventing and thereby rotating a gear to contact the parking lever and rotate the parking lever to move the parking pin past a flexible hook that holds the parking lever within the cam slot and into a cavity, so that the wheel can be rotated when anther film cassette is inserted into the film cassette compartment.

23. A camera of the type that employs a film cassette that has a light lock door and a visual exposure indicator, the visual exposure indicator having a parked position that indicates the film within the film cassette has been exposed, the camera comprising a film cassette compartment, disposed on a first end of the camera, that can receive the film cassette, a film spool, disposed on a second end of the camera that opposes the first end of the camera, around which film can be wound, a film path, disposed between the film cassette compartment and the film spool, in which film is exposed and along which the film travels as the film moves between the film cassette compartment and the film spool, the camera comprising:

a manual film advancing mechanism, mounted to the camera, and coupled to a spindle of the film cassette when the film cassette is inserted into the film cassette compartment, the film advancing mechanism moving film along the film path when the film advancing mechanism is manipulated and the film advancing mechanism comprising a rotatable wheel gear comprising an inner periphery, that defines a cavity, and a cam slot, disposed in a wall of the wheel, the cam slot having an entrance along the inner periphery and a pocket disposed at an end of the cam slot; and a parking mechanism, mounted to the camera, and engaging the film advancing mechanism after the film advancing mechanism has been rotated a sufficient angular distance and after all of the film has been rewound into the film cassette to thereby prevent further rotation of the film advancing mechanism and indicate that the visual exposure indicator has moved to the parked position.

24. The camera of claim 23, wherein the manual film advancing mechanism comprises a rotatable serrated wheel.

25. The camera of claim 23, wherein the manual film advancing mechanism comprises a rotatable serrated wheel that is coupled to the rotatable wheel gear and the wheel gear is contacted by the parking mechanism.

26. The camera of claim 23, wherein the mechanism comprises a parking lever, rotatably mounted to the camera, and having a parking pin disposed on a first end, the parking pin resting within the cavity while film is being thrust from the cassette and traveling into the cam slot while film is being rewound into the film cassette and being disposed in the pocket after the film has been rewound into the film cassette, to prevent further rotation of the rotatable wheel gear and thereby indicate that the film cassette is in the parked position.

27. The camera of claim 26, further comprising a film sensor, rotatably mounted to the camera and disposed within the film path, the film sensor being contacted by film within the film path to cause the film sensor to rotate and hold the parking lever, so that the pin is disposed within the cavity, the film sensor being released by the film as a trailing edge of the film passes the film sensor and enters the film cassette to cause the film sensor to rotate and thereby release the parking lever and cause the pin to move through the entrance of the cam slot and into the cam slot, further rotation of the serrated wheel and the wheel gear moving the cam slot until the pocket contacts the pin, the contact of the pocket preventing further rotation of the wheel gear and indicating that the film cassette is in the parked position.

* * * * *

UNITED STATES PATENT AND TRADEMARK OFFICE
CERTIFICATE OF CORRECTION

PATENT NO. : 6,280,103 B1
DATED : August 28, 2001
INVENTOR(S) : Zawodny et al.

It is certified that error appears in the above-identified patent and that said Letters Patent is hereby corrected as shown below:

Column 5,
Line 27, after the word "cassette" please insert the word -- compartment --;
Line 47, before the word "may" please insert -- cassette 14 --;
Line 48, after the word "be" please insert the word -- a --;
Line 52, please delete the second occurrence of the word "the" and insert therefor -- The --;
Line 55, please delete the second occurrence of the word "the";
Line 63, please delete the word "are";

Column 16,
Line 56, please delete "anther" and insert therefor -- another --;

Column 18,
Line 1, after the second occurrence of the word "the" please insert the word -- parking --.

Signed and Sealed this

Thirteenth Day of August, 2002

Attest:

JAMES E. ROGAN
*Attesting Officer*     *Director of the United States Patent and Trademark Office*